(12) United States Patent
Maruyama et al.

(10) Patent No.: US 11,658,532 B2
(45) Date of Patent: May 23, 2023

(54) STATOR AND METHOD OF PRODUCING THE SAME

(71) Applicants: DENSO CORPORATION, Kariya (JP); TOYOTA JIDOSHA KABUSHIKI KAISHA, Toyota (JP)

(72) Inventors: Ryosuke Maruyama, Kariya (JP); Hiroaki Takeda, Kariya (JP); Yasuhiro Makido, Toyota (JP); Toshiro Nakamura, Nisshin (JP); Ken Shirai, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 17/019,464

(22) Filed: Sep. 14, 2020

(65) Prior Publication Data

US 2021/0083539 A1 Mar. 18, 2021

(30) Foreign Application Priority Data

Sep. 12, 2019 (JP) .............................. JP2019-166345

(51) Int. Cl.
*H02K 3/12* (2006.01)
*H02K 1/16* (2006.01)
(Continued)

(52) U.S. Cl.
CPC ............... *H02K 3/12* (2013.01); *B21D 28/28* (2013.01); *H02K 1/16* (2013.01); *H02K 3/14* (2013.01); *H02K 3/28* (2013.01); *H02K 3/345* (2013.01); *H02K 15/0081* (2013.01); *H02K 15/0421* (2013.01); *H02K 15/085* (2013.01); *H02K 15/10* (2013.01)

(58) Field of Classification Search
CPC .. H02K 3/04; H02K 3/12; H02K 3/38; H02K 3/50; H02K 15/0421; H02K 15/085
USPC .................................................. 310/201, 202
See application file for complete search history.

(56) References Cited

U.S. PATENT DOCUMENTS

| | | |
|---|---|---|
| 2011/0181144 A1 | 7/2011 | Ishizuka et al. |
| 2015/0364977 A1 | 12/2015 | Hattori |
| 2019/0334397 A1 | 10/2019 | Kaji et al. |

FOREIGN PATENT DOCUMENTS

| | | | |
|---|---|---|---|
| JP | 2018-117466 A | | 7/2018 |
| JP | 2018117466 A | * | 7/2018 |

* cited by examiner

*Primary Examiner* — Ahmed Elnakib
*Assistant Examiner* — Minki Chang
(74) *Attorney, Agent, or Firm* — Oliff PLC

(57) ABSTRACT

A stator has a stator core composed of teeth and slots. Segment coils are inserted into the corresponding slots. The segment coil projecting from the slot has an exposed conductor part and a covered conductor part covered with an electrical insulation film. The exposed conductor part is arranged at the distal end side from the covered conductor part of the segment coil. The segment coils are connected together through the exposed conductor parts thereof projecting from the slots. The exposed conductor part has a thickness T2 thinner than a thickness T1 of the covered conductor part. A step part is formed at a position of the stator core side, adjacent to the exposed conductor part of the segment coil. The step part and the covered conductor part are covered with the electrical insulation film continuously from the stator core side of the covered conductor part.

9 Claims, 10 Drawing Sheets

(51) Int. Cl.
*H02K 3/28* (2006.01)
*H02K 3/34* (2006.01)
*H02K 15/04* (2006.01)
*H02K 15/085* (2006.01)
*H02K 15/10* (2006.01)
*H02K 15/00* (2006.01)
*H02K 3/14* (2006.01)
*B21D 28/28* (2006.01)

STATOR AND METHOD OF PRODUCING THE SAME

CROSS-REFERENCE TO RELATED APPLICATION

This application is related to and claims priority from Japanese Patent Application No. 2019-166345 filed on Sep. 12, 2019, the contents of which are hereby incorporated by reference.

TECHNICAL FIELD

The present disclosure relates to stators and methods of producing a stator.

BACKGROUND

There have been known rotary electric machines composed of a stator and a plurality of segment coils. The stator has a stator core in which a plurality of slots are formed, and the plurality of segment coils are inserted into the corresponding slots. The segment coils are arranged in the slots. For example, in a known rotary electric machine, exposed conductor parts at the end of each segment coils (hereinafter, the coil end part), projecting from the corresponding slots formed in the stator core, are electrically connected together by welding. The coil end parts of the segment coils are electrically connected together. The coil end parts of the segment coils and an electrical insulation film around the coil end parts of the segment coils are sealed together by a sealing insulator. The stator has a non-adhesion part, formed on the coil end part of each segment coil, in which an adhesive force between a conductor part of the segment coil and the electrical insulation film is reduced. The non-adhesion part has a swollen shape, i.e., swelling outward the sealing insulator from the conductor part of the segment coil. The electrical insulation film from the non-adhesion part and the conductor part in each segment coil are relatively deformed according to a temperature change. This makes it possible to reduce a stress change applied from the electrical insulation film of the segment coil to the sealing insulator due to a temperature fluctuation.

However, as previously described, because the non-adhesion part of each segment coil in the stator has a swollen shape, i.e., swelling outward from the conductor part of the segment coil, this structure makes it difficult to closely or adjacently arrange the coil end parts together, projecting from the adjacent slots in the circumferential direction of the stator core. As a result, it is difficult to reduce the overall size of the stator having the structure previously described.

In the stator having the structure previously described, when the non-adhesion part formed at the coil end part of the segment coil has a flat shape, without any swollen shape, and the coil end parts are closely arranged or in contact together, it is possible to reduce the overall size of the stator. However, this structure of the stator causes a drawback in which the exposed conductor part of one segment coil is arranged close to the electrical insulation film of the other segment coil. This arrangement causes a discharge between the exposed conductor part of one segment coil and the electrical insulation film of the other segment coil. This arrangement reduces the electrical insulation between the segment coils due to the damage of the electrical insulation film of the other segment coil. This reduces the electrical reliability of the stator. On the other hand, increasing a thickness of the electrical insulation film may increase the overall size of the stator or reduce an overall conductor part of the segment coil in the slot of the stator.

SUMMARY

It is desired for the present disclosure to provide a stator of a rotary electric machine, having a stator core composed of teeth and slots. Segment coils are inserted into the corresponding slots. The segment coil projecting from the slot has an exposed conductor part and a covered conductor part covered with an insulation film. The exposed conductor part is arranged at a distal end side from the covered conductor part of the segment coil. The segment coils are connected together through the exposed conductor parts thereof projecting from the slots. The exposed conductor part has a thickness T2 thinner than a thickness T1 of the covered conductor part. A step part is formed at a position of the stator core side, adjacent to the exposed conductor part of the segment coil. The step part and the covered conductor part are covered with the electrical insulation film continuously from the stator core side of the covered conductor part.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
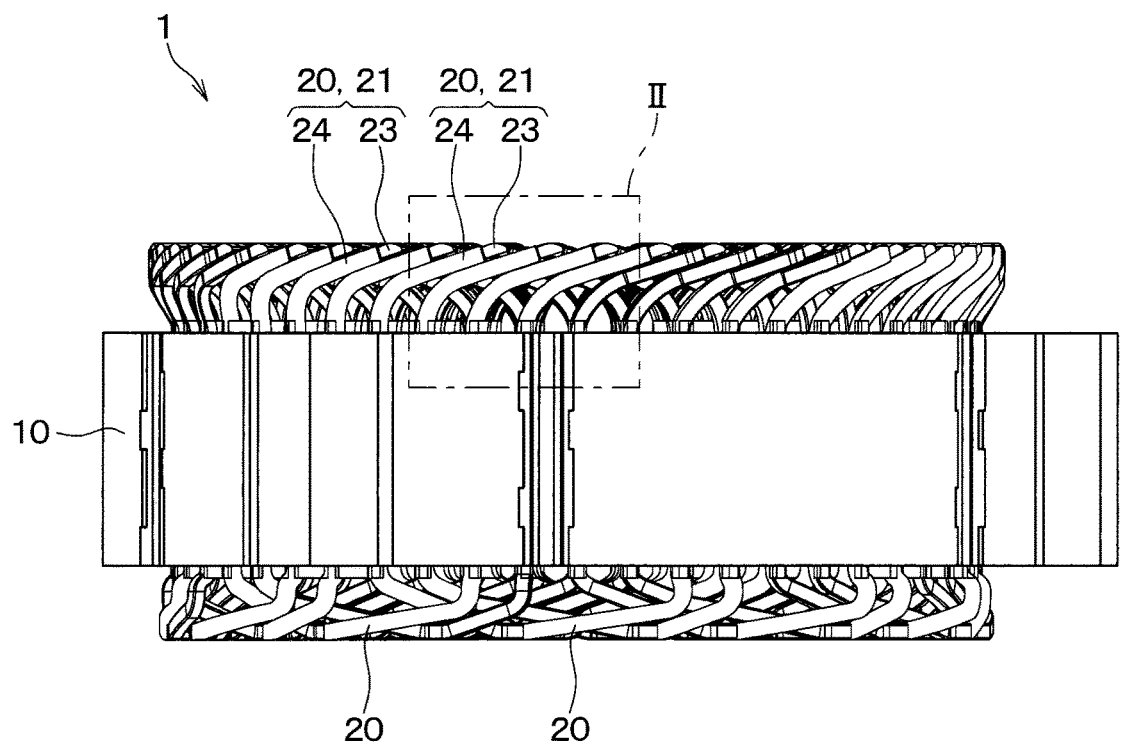
FIG. 1 is a view showing a semi-finished product of a stator according to an exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

Exemplary Embodiment

A description will be explained of a stator 1 and a method of producing the stator 1 according to an exemplary embodiment of the present disclosure with reference to FIG. 1 to FIG. 14.

Figure 2:
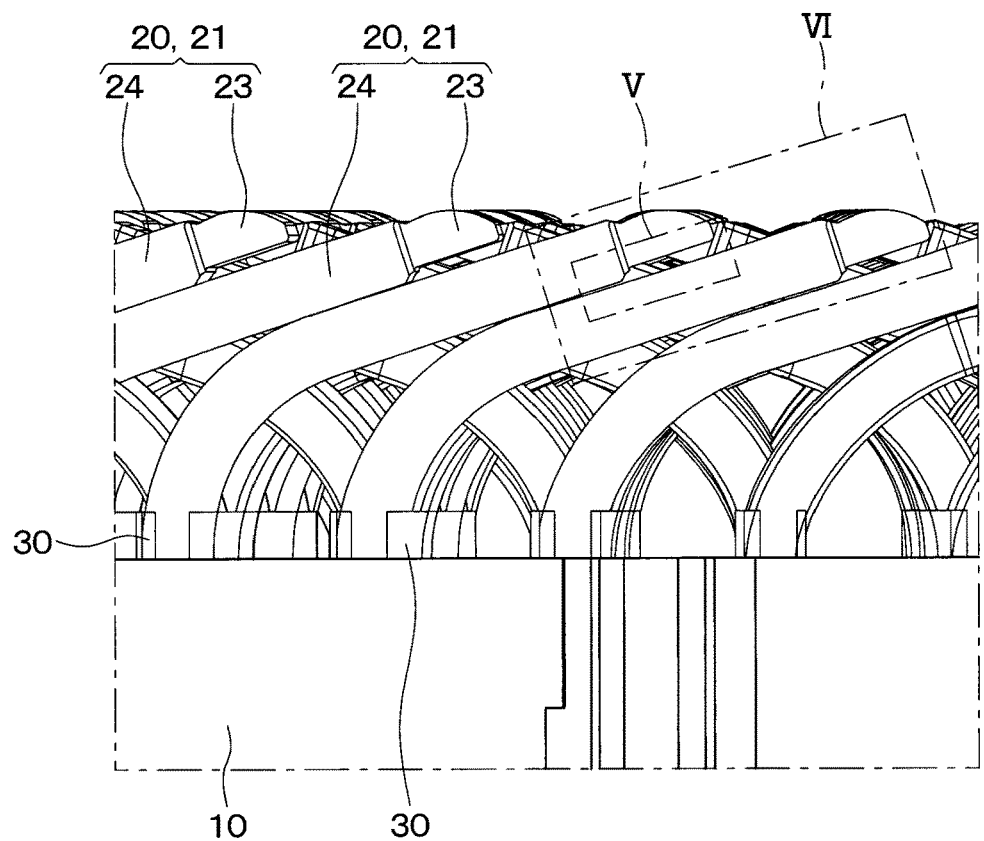
FIG. 2 is an enlarged view of an area II shown in FIG. 1.

FIG. 1 is a view showing a semi-finished product of the stator 1 according to the exemplary embodiment. FIG. 2 is an enlarged view of an area II shown in FIG. 1.

Figure 3:
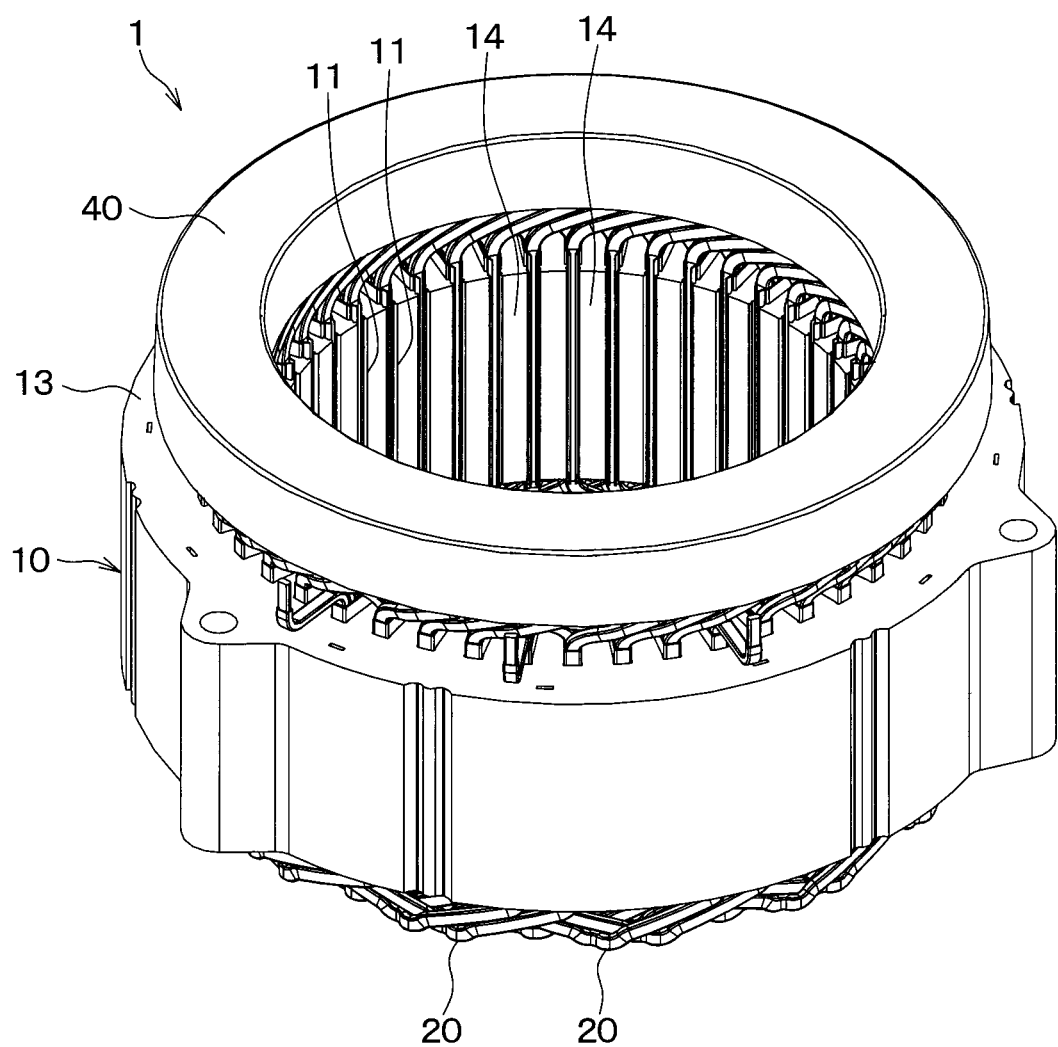
FIG. 3 is a perspective view of the stator according to the exemplary embodiment of the present disclosure.
Figure 4:
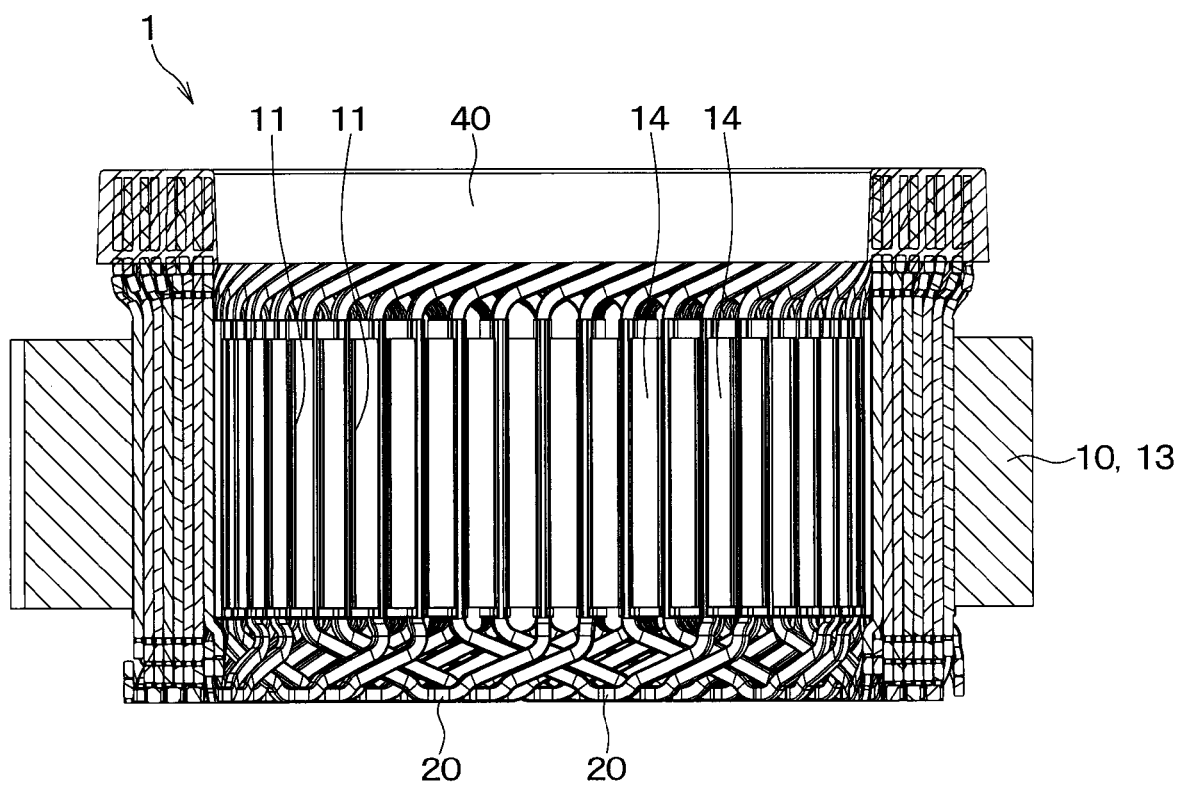
FIG. 4 is a view showing a cross section of the stator according to the exemplary embodiment of the present disclosure.

FIG. 1 and FIG. 2 show a semi-finished product of the stator 1. On the other hand, FIG. 3 and FIG. 4 show a finished product of the stator 1. In more detail, FIG. 3 is a perspective view of the stator 1 according to the exemplary embodiment. FIG. 4 is a view showing a cross section of the stator 1 according to the exemplary embodiment.

The stator 1 according to the exemplary embodiment forms a rotary electric machine, for example. That is, such a rotary electric machine has the stator 1 and a rotor rotatably arranged in the inside of the stator 1. A rotary electric machine has at least one of two functions, a motor as a moving drive power source of a motor vehicle, etc. and a generator of generating electric power. The method according to the exemplary embodiment produces the stator 1.

As previously explained, FIG. 1 and FIG. 2 show a semi-finished product of the stator 1. On the other hand, FIG. 3 and FIG. 4 show a finished product of the stator 1 produced by the method according to the exemplary embodiment.

As shown in FIG. 1 to FIG. 4, the stator 1 has a stator core 10 of a ring shape and a plurality of segment coils 20 (hereinafter, the segment coils 20). The stator core 10 has a plurality of slots 11 (hereinafter, the slots 11). The segment coils 20 and insulators 30 are inserted into the inside of the corresponding slots. FIG. 1 and FIG. 2 show a part of the segment coils and the insulators 30 projected outside from the slots formed in the stator core 10.

The stator core 10 has a back core 13 and teeth 14. The teeth 14 are extended inwardly from the back core 13 of a ring shape. The slots 11 are formed between the teeth 14 in the stator core 14 of the stator 1. The stator core 10 is composed of a plurality of steel sheets made of magnet material. The steel sheets are stacked in an axial direction of the stator core 10.

Each of the segment coils 20 approximately has a U shape and is inserted in the corresponding slot 11 formed in the stator core 10 of the stator 1.

Figure 5:
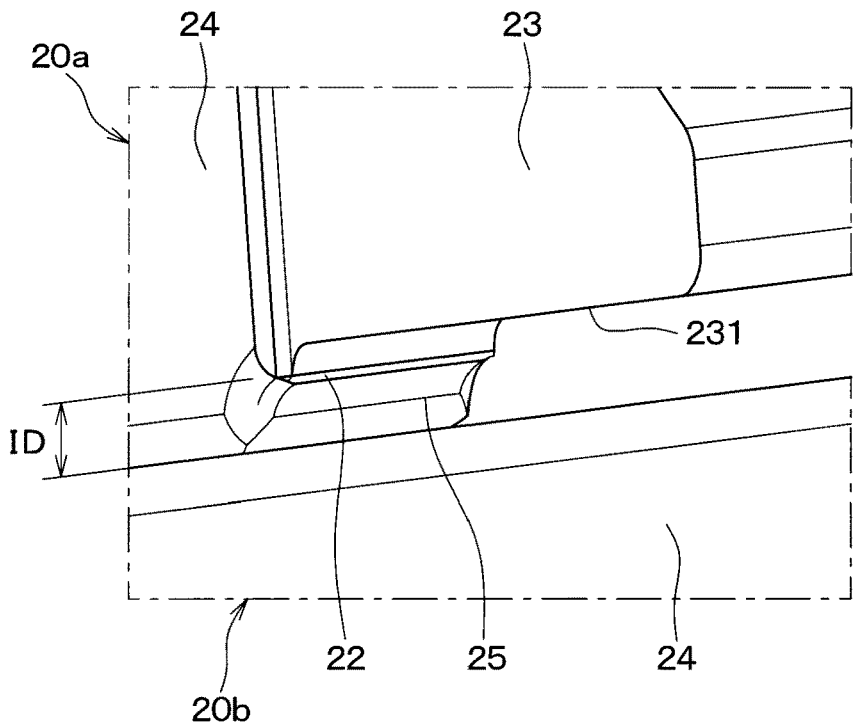
FIG. 5 is a perspective view of two segment coils adjacently arranged in the area V of the stator core of the stator shown in FIG. 2.
Figure 6:
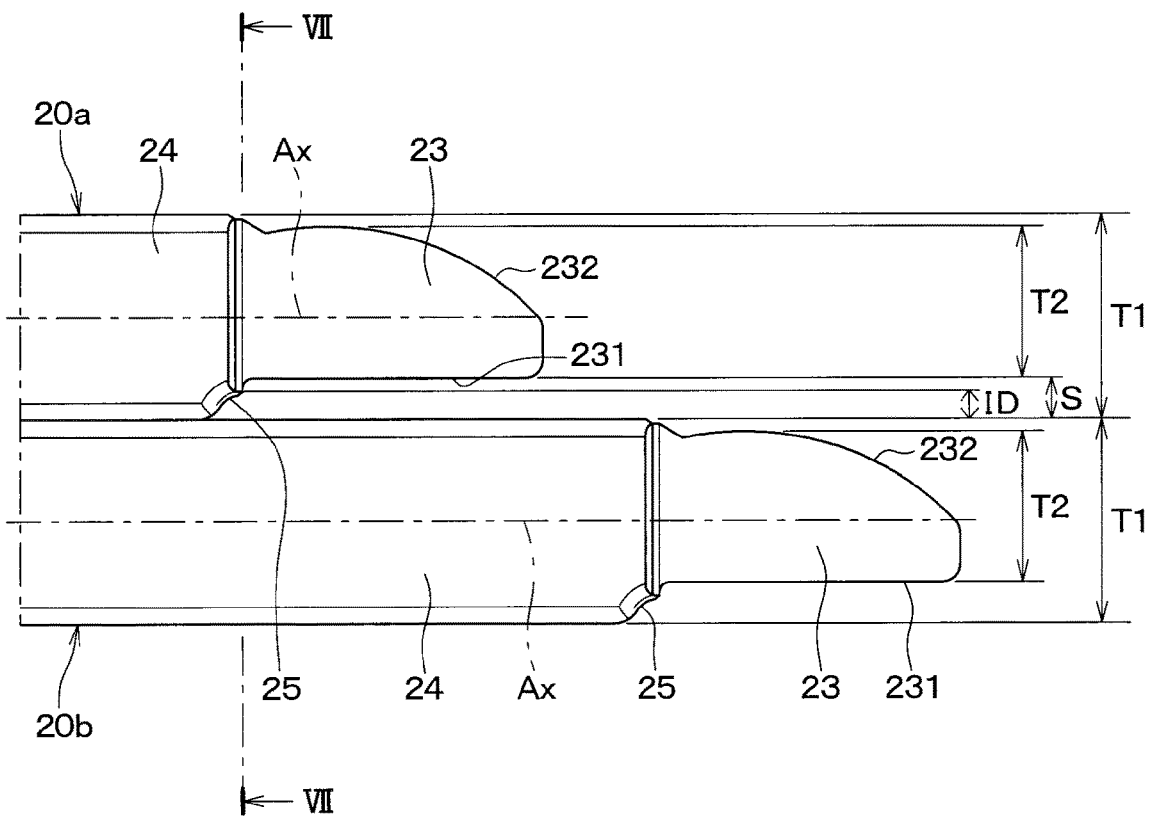
FIG. 6 is a side view of the two segment coils adjacently arranged in the area VI of the stator core shown in FIG. 2.
Figure 7:
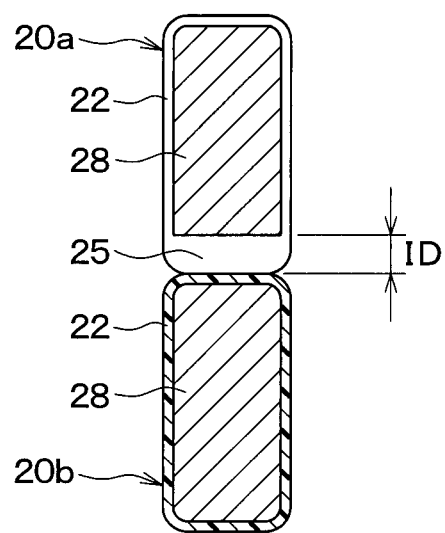
FIG. 7 is a view showing a cross section of the two segment coils adjacently arranged along the line VII-VII shown in FIG. 6.

FIG. 5 is a perspective view of two segment coils 20 adjacently arranged in the area V of the stator core 10 of the stator 1 shown in FIG. 2. FIG. 6 is a side view of the two segment coils adjacently arranged in the area VI of the stator 2 shown in FIG. 2. FIG. 7 is a view showing a cross section of the two segment coils adjacently arranged along the line VII-VII shown in FIG. 6.

As shown in FIG. 7, a cross section of each segment coil 20, perpendicular to the longitudinal thereof is covered with an electrical insulation film 22 made of insulator such as enamel. In more detail, each segment coil 20 has a conductor 28 such as a flat wire covered with the electrical insulation film 22.

Each segment coil 20 is made of a flat wire as the conductor 28 covered with the electrical insulation film 22. Each segment coil 20 has four side surfaces, and two end surfaces. The four side surfaces of each segment coil 20 are composed of two flatwise surfaces and two edgewise surfaces. Each flatwise surface is arranged at a long side of each segment coil 20, and each edgewise surface is arranged at a short side of each segment coil 20 on a cross section of each segment coil 20 shown in FIG. 7, perpendicular to the longitudinal direction thereof.

Hereinafter, the flatwise surface will be referred to as the FW surface and the edgewise surface will be referred to as the EW surface.

In the structure of the stator 1 according to the exemplary embodiment, the FW surfaces of each segment coil 20 are arranged facing the radial direction of the stator core 10, and the EW surfaces are arranged facing the circumferential direction of the stator core 10.

As shown in FIG. 1 and FIG. 2, a part (hereinafter, referred to as the coil end part 21) of each segment coil 20, which projects from the stator core 10, is arranged to be inclined at a predetermined angle to the circumferential direction of the stator core 10. An exposed conductor part 23, from which the electrical insulation film 22 has been removed, is formed at the tip of the coil end part 21 of each segment coil 20. The exposed conductor part 23 of the coil end parts 21 of the segment coils, which are arranged adjacently in the radial direction of the stator core 10, are electrically connected together by welding. In a rotary electric machine having the stator 1, the segment coils are connected in a Y connection or a Δ connection so as to form a three-phase alternating current circuit (or a three-phase AC circuit).

Each segment coil 20 is composed of the exposed conductor part 23 and a covered conductor part 24. The exposed conductor part 23 is the conductor part without the electrical insulation film 22. On the other hand, in the covered conductor part 24, the conductor part is covered with the electrical insulation film 22. That is, the covered conductor part 24 is arranged at a location toward the stator core 10 side more than the location of the exposed conductor part 23 in each segment coil 20.

In the structure of the stator 1 as a finished product, for example shown in FIG. 3 and FIG. 4, the covered conductor part 24 of one segment coil 20 and the exposed conductor part 23 of the other segment coil, which are arranged closer to each other, are sealed with a sealing insulator 40. The sealing insulator 40 is made of a thermosetting resin, for example.

A description will now be given of a structure of the segment coils 20 before the sealing process with the sealing insulator 40 in the stator 1 according to the exemplary embodiment.

FIG. 5 and FIG. 6 show the exposed conductor part 23 of one segment coil 10 and the covered conductor part 24 of the other segment coil 10, which are adjacently arranged in the stator 1, before the sealing process with the sealing insulator 40 in the method of producing the stator 1. Specifically, FIG. 5 and FIG. 6 show the segment coil 20a and the segment coil 20b only. That is, the segment coil 20a projects from one slot 11 of the stator 1. The segment coil 20b projects from the other slot of the stator 1. The segment coil 20b is arranged adjacent in the circumferential direction of the stator core 10 to the segment coil 20a.

As shown in FIG. 6, the segment coil 20 (20a, 20b) is formed so that the exposed conductor part 23 has a thickness T2 which is thinner than a thickness T1 of the covered conductor part 24 (T2<T1) when viewed from the radial direction of the stator core 10 (i.e. when viewed from the FW surface side).

A step part 25 is formed in the covered conductor part 24 of each segment coil at a location adjacent to the exposed conductor part 23 of the adjacently-arranged segment coil. In more detail, as shown in FIG. and FIG. 6, the step part 25 is formed on the surface at the stator core 10 side of the segment coil. As shown in FIG. 5, FIG. 6 and FIG. 7, the step part 25 is covered with the electrical insulation film 22 continuously sealed from a proximal end side of the covered conductor part 24, i.e. at the stator core 10 side. The proximal end side of the covered conductor part 24 is opposite from the distal end side of the segment coil 20.

As shown in FIG. 2, the coil end part 21 of each segment coil 20 projecting from the corresponding slot 11 of the stator core 10 is tilted toward the circumferential direction of the stator core 10 so that the coil end parts of the segment coils 20 have approximately the same shape.

As shown in FIG. 5 to FIG. 7, the segment coil 20a projecting from one slot 11 of the stator core 10 and the segment coil 20b projecting from the other slot 11 are adjacently arranged along the circumferential direction of the stator core 10. That is, FIG. 5 to FIG. 7 show the situation in which the covered conductor part 24 of the segment coil 20a is arranged adjacently in contact with the covered conductor part 24 of the segment coil 20b. Further, as shown in FIG. 5 to FIG. 7, an insulation gap of a predetermined insulation distance ID as the required minimum distance is formed between the surface 231 (see FIG. 5 and FIG. 6) at the stator core 10 side of the exposed conductor part 23 of the segment coil 20a and the covered conductor part 24 of the segment coil 20b.

In the structure of the stator 1 according to the exemplary embodiment, the insulation gap having the predetermined insulation distance ID is thicker than the thickness of the electrical insulation film 22 of the segment coil 20. Specifically, the insulation gap having the predetermined insulation distance ID is not less than twice of the thickness of the electrical insulation film 22 of the segment coil 20. This structure of the stator 1 makes it possible to suppress electric discharge from occurring between the exposed conductor part 23 of the segment coil 20a and the electrical insulation film 22 covering the covered conductor part 24 of the segment coil 20b.

As shown in FIG. 6, the surface 231 at the stator core 10 side of the exposed conductor part 23 is arranged parallel with the axis Ax of each segment coils 20. This arrangement makes it possible to satisfy that a gap S between the exposed conductor part 23 of the segment coil 20a and the covered conductor part 24 of the segment coil 20b is approximately equal to or greater than the insulation gap having the predetermined insulation distance ID on the overall surface 231 at the stator core 10 side of the exposed conductor part 23 of the segment coil 20a.

As previously explained, in a case in which the segment coils 20 are connected in a three-phase AC circuit in the stator 1, when electric power is supplied to the stator 1 in a rotary electric machine, this structure of the stator 1 makes it possible to suppress electric discharge from occurring between the exposed conductor part 23 of the segment coil 20a and the electrical insulation film 22 covering the covered conductor part 24 of the segment coil 20b. This structure of the stator 1 makes it possible to arrange the segment coils 20 adjacently to each other and close to each other, projecting from the slots 11 along the circumferential direction of the stator core 10. This structure makes it possible to reduce and miniaturize the overall size of the stator 1 while maintaining electrical insulation reliability thereof.

Next, a description will be given of the method of producing the stator 1 according to the exemplary embodiment with reference to FIG. 8, FIG. 9 and FIG. 10.

Figure 8:
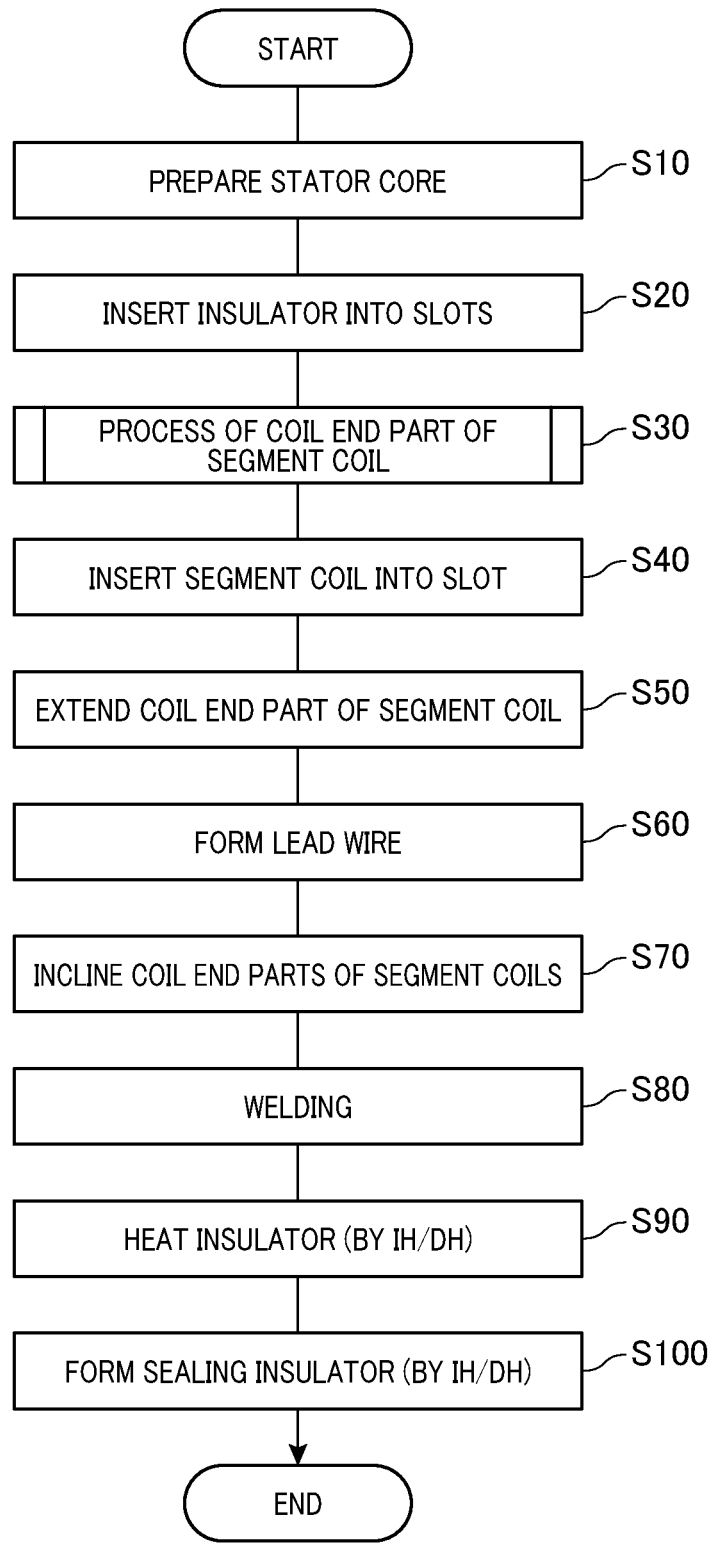
FIG. 8 is a view showing a flow chart of a method of producing the stator according to the exemplary embodiment of the present disclosure.

FIG. 8 is a view showing a flow chart of the method of producing the stator 1 according to the exemplary embodiment of the present disclosure. As shown in FIG. 8, in step S10, the stator core 10 is prepared. As previously described, the stator core 10 has the teeth 14 and the slots 11. The operation flow progresses to step S20.

In step S20, the insulator 30 is inserted into the corresponding slot 11 of the stator core 10. For example, the insulator 30 is an insulator foam made of thermosetting foam resin thermally foamed and hardened. The operation flow progresses to step S30.

In step S30, the terminal part, i.e. the coil end of each segment coil 20 is processed. Step S30 is also referred to as the segment coil termination processing process.

A description will now be given of the segment coil termination processing process in detail with reference to FIG. 9, FIG. 10 and FIG. 11.

Figure 9:
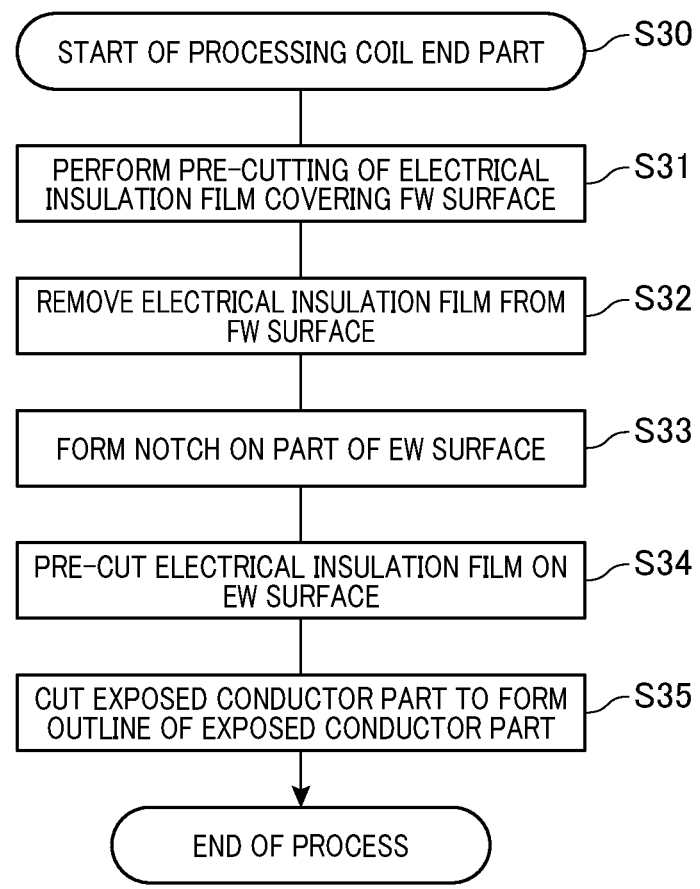
FIG. 9 is a flow chart of a segment coil termination processing process in the method shown in FIG. 8.

FIG. 9 is a flow chart of the segment coil termination processing process in the method shown in FIG. 8. FIG. 10 is a view showing a detailed explanation of the segment coil termination process shown in FIG. 9.

In step S31 shown in FIG. 9, pre-cutting is performed to cut the electrical insulation film 22 covering the FW surface of the segment coil 20. As shown in Column A of FIG. 10, first blades 50 and 51 are arranged at a predetermined position on the FW surface and pressed to the segment coil 20 so as to cut the electrical insulation film 22 of the segment coil 20. The operation flow progresses to step S32.

In step S32 shown in FIG. 9, a part of the electrical insulation film 22 of the segment coil 20 is removed from the segment coil 20. As shown in Column B of FIG. 10, a second blade 52 is arranged at the distal end side from a notch of the electrical insulation film 22 formed by using the first blades 50, 51 in step S31. The second blade 52 is moved until a second blade die 53 along the FW surface so as to remove the electrical insulation film 22 from the FW surface of the segment coil 20. This removes, from the FW surface of the segment coil 20, the electrical insulation film 22 at the distal end side from the notch thereof formed in step S31 so as to form the exposed conductor part 23 and the covered conductor part 24 in the coil end parts 21 of the segment coil 20. The operation flow progresses to step S33 shown in FIG. 9.

In step S33, a part of the EW surface of the segment coil 20 is crushed. As shown in Column C of FIG. 10, a pressure punch 54 is arranged on one of the EW surfaces of the segment coil 20, and a pressure punch die 55 is arranged on the other EW surface of the segment coil 20. The EW surfaces of the segment coil 20 are covered with the electrical insulation film 22 which are not removed in step S32.

Figure 10:
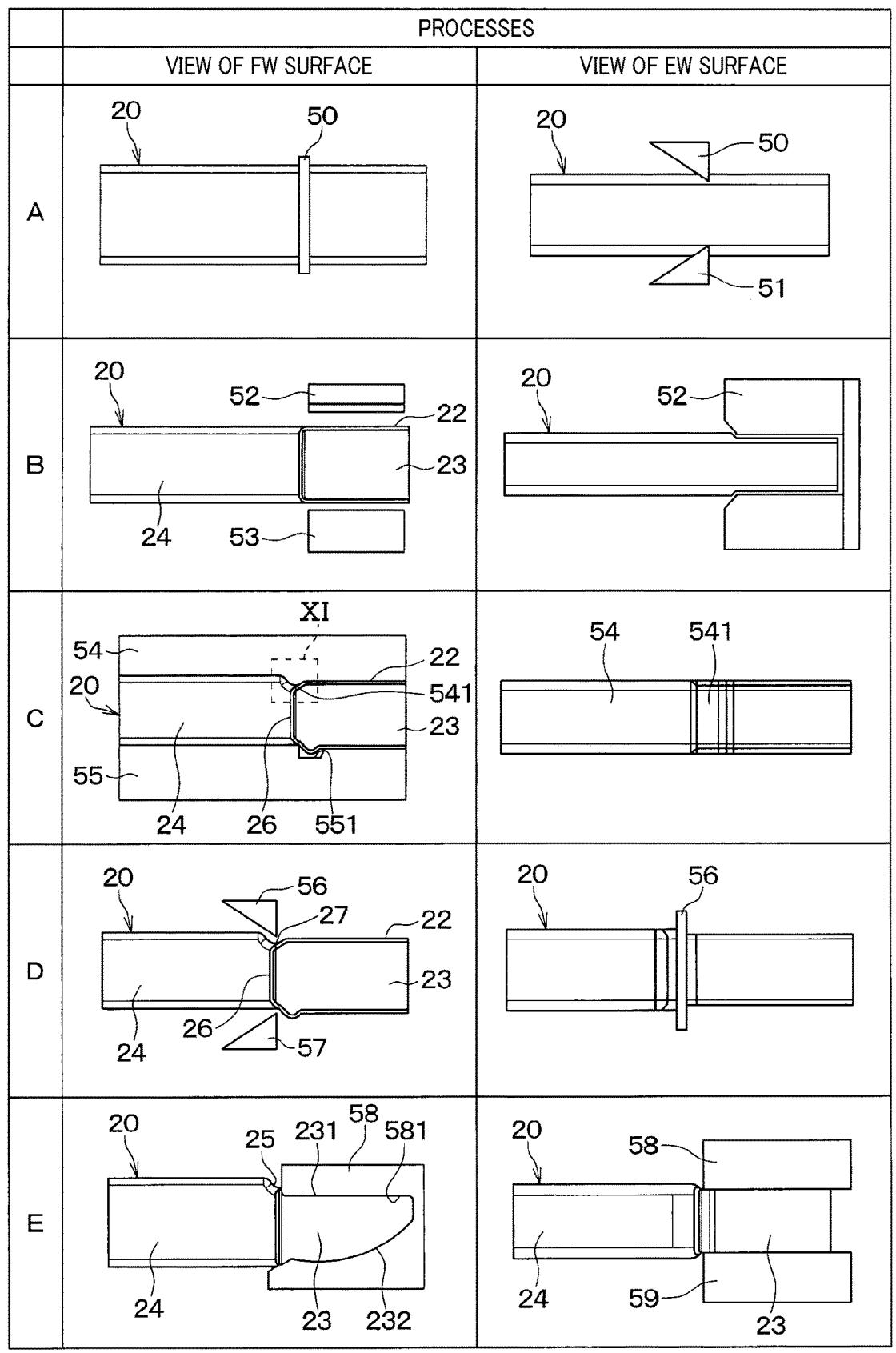
FIG. 10 is a view showing a detailed explanation of the segment coil termination process shown in FIG. 9.

As shown in Column C of FIG. 10, the pressure punch 54 has a projection part 541 which projects toward the segment coil 20 side. The pressure punch 54 is viewed from the segment coil 20 side in the EW viewer in Column C of FIG. 10.

A cross section of the projection part 541 of the pressure punch 54 has an arc shape extending toward a direction perpendicular to the axis Ax of the segment coil 20.

On the other hand, the pressure punch die 55 has a groove 551 having a size corresponding to the projection part 541 of the pressure punch 54.

The pressure punch 54 is arranged at a predetermined position on the EW surface of the segment coil 20. The predetermined position is determined at a location or a near location of a boundary 26 between the exposed conductor part 23 and the covered conductor part 24 on the FW surface of the segment coil 20.

On the other hand, the pressure punch die 55 is arranged at a predetermined position on the EW surface opposite to the location of the pressure punch 54 in the segment coil 20. The groove 551 of the pressure punch die 55 is arranged at the predetermined position of the pressure die 55, at the distal end side from the boundary 26 between the exposed conductor part 23 and the covered conductor part 24 on the FW surface of the segment coil 20.

The projection part 541 of the pressure punch 54 pushes the predetermined position on the segment coil 20 so as to crush the conductor 28 and the electrical insulation film 22 of the segment coil 20 together. In more detail, the pressure punch 54 forcedly presses the conductor 28 and the electrical insulation film 22 of the segment coil 20 by a pressure more than its yield point so as to crush the conductor 28 and the electrical insulation film 22 of the segment coil 20 together. This crushing process in step S33 shown in FIG. 9 causes plastic deformation of the conductor 28 and the electrical insulation film 22 of the segment coil 20. As a result, the crushing process in step S33 forms a recess part 27 in the segment coil 20.

The recess part 27 is formed at the position on the area including the boundary 26 between the exposed conductor part 23 and the covered conductor part 24 on the FW surface of the segment coil 20. That is, the recess part 27 is formed in an arc shape when viewed from the FW surface side, extending to a direction perpendicular to the axis Ax of the segment coil 20.

Figure 11:
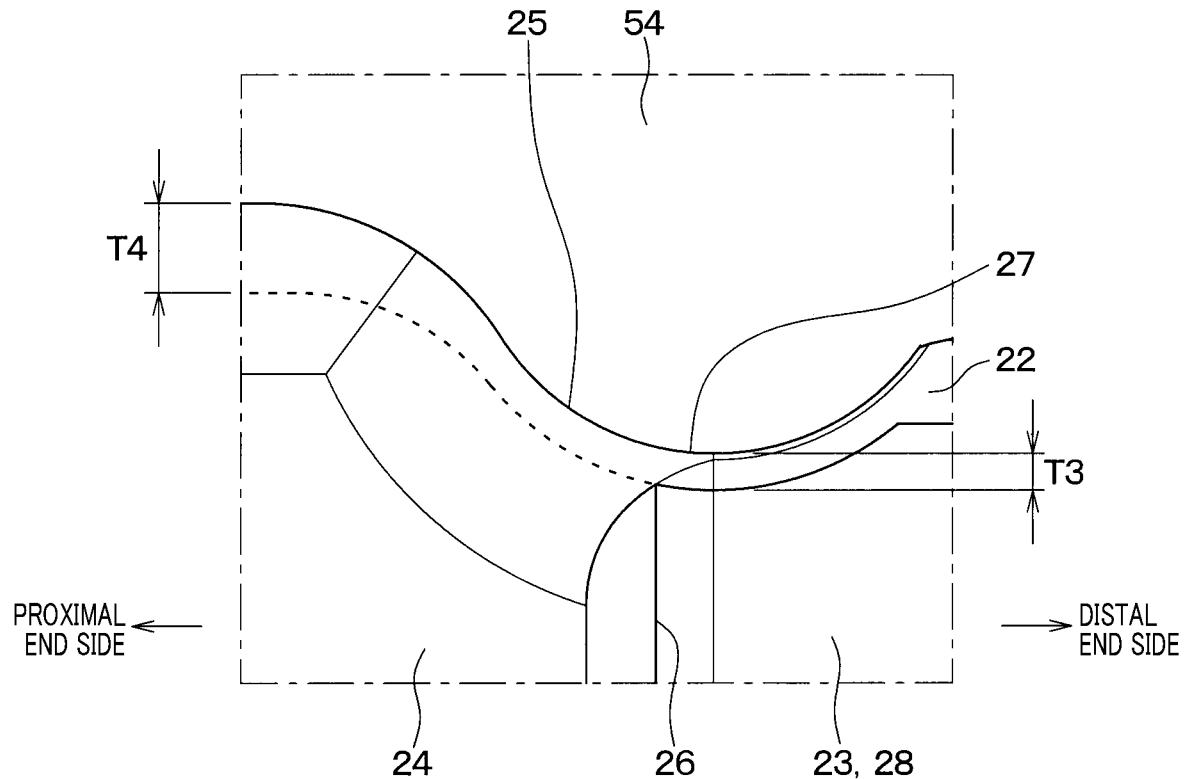
FIG. 11 is an enlarged view of an area XI designated by a dash-dotted line shown in FIG. 10.

FIG. 11 is an enlarged view of an area XI designated by a dash-dotted line shown in FIG. 10. As shown in FIG. 11, the electrical insulation film 22 covering the recess part 27 has a thickness T3 which is thinner than the thickness T4 of the electrical insulation film 22 covering the covered conductor part 24 at a proximal end side more than the recess part 27. The thickness T3 of the electrical insulation film 22 at the recess part 27 is formed by a pressure of more than the yield point of the conductor 28 and the electrical insulation film 22 of the segment coil 20. This allows pre-cutting of the electrical insulation film 22 covering the FW surface of the segment coil 20 to be easily performed in the following step S34.

In step S34 shown in FIG. 9, the pre-cutting of the electrical insulation film 22 covering the EW surface of the segment coil 20 is performed. As shown in Column D of FIG. 10, third blades 56, 57 are arranged at an intermediate position of the recess part 27 formed on the EW surface. The third blades 56, 57 are pressed at the intermediate position of the recess part 27 so as to form a notch in the electrical insulation film 22. The intermediate position of the recess part 27 includes a center point of the recess part 27 and a point near the center point. The operation flow progresses to step S35.

In step S35, the distal end side from the notch formed in the recess part 27 becomes the exposed conductor part 23 and the proximal end side from the notch becomes the covered conductor part 24 of the coil end part of the segment coil 20.

In step S35 shown in FIG. 9, the exposed conductor part 23 of the segment coil 20 is cut. As shown in Column E of FIG. 10, a punching cutter 58 is arranged on one of the FW surfaces of the segment coil 20, and a punching cutter die 59 is arranged at the other FW surface.

The punching cutter 58 has a processing hole 581, a size of which corresponds to the outline of the exposed conductor part 23. On the other hand, the punching cutter die 59 has a projection part (not shown), the outline of which corresponds to the processing hole 581 of the punching cutter 58.

The punching cutter 58 is moved toward the punching cutter die 59 side in the cutting process to form the outline of the exposed conductor part 23.

As previously described with reference to FIG. 6, the outline of the exposed conductor part 23 has the structure, when viewed from the FW surface side, in which the thickness T2 of the exposed conductor parts 23, formed toward the end part from the intermediate position of the recess part 27, is thinner than the thickness T1 of the covered conductor part 24 at the proximal end side of the recess part 27. Accordingly, as shown in FIG. 11, the step part 25 is formed at the proximal end side from the intermediate position of the recess part 27 in the segment coil 20.

In the cutting process shown in step S25, the outline of the exposed conductor parts 23 is formed while the electrical insulation film 22 remains in the step part 25. That is, the step part 25 of the segment coil 20 is covered with the electrical insulation film 22 continuously from the proximal end side.

In the crush process shown in step S33 of FIG. 9, as has been explained with reference to FIG. 11, the thickness T3 of the electrical insulation film 22 covering the recess part 27 is thinner than the thickness T4 of the electrical insulation film 22 covering the covered conductor part 24 at the proximal end side from the location of the recess part 27. Accordingly, in step S34 of FIG. 9, the pre-cutting of the electrical insulation film 22 which covers the EW surface of the segment coil 20 is reliably performed.

In the cutting process of cutting the exposed conductor parts 23 of the segment coil 20 in step S35, it is possible to easily and reliably remove the electrical insulation film 22, at the distal end side except for the step part 25. This makes it possible to prevent the electrical insulation film 22 from being removed except for the step part 25 due to a rolling-up of the electrical insulation film 22 on the step part 25.

The cutting process forms the EW surface 231, to be parallel with the axis Ax of the segment coil 20, at the step part 25 side in the exposed conductor part 23. On the other hand, the cutting process forms the EW surface 232 to have a curved shape, opposite to the step part 25 in the exposed conductor part 23.

After the process of step S35, the termination processing process in step S30 of FIG. 8 is completed. The operation process progresses to step S40 of FIG. 8.

In step S40 of FIG. 8, the segment coils 20 are inserted into the corresponding slots 11 of the stator core 10 so that the insulator 30 is arranged between the inner wall of each slot 11 and the corresponding segment coil 20. Further, the segment coils 20 are arranged in turn in the radial direction of the stator core 10 in each slot 11 so that the coil end parts 21 of the segment coils 20 are projecting from each slot 11 of the stator core 10. The operation flow progresses to step S50.

In step S50, the coil end part 21 of each segment coil 20 is extended toward a radial direction of the stator core 10 so as to form a predetermined gap between the coil end parts 21 of the segment coils 20. The operation flow progresses to step S60.

In step S60, lead wires are formed to have a predetermined shape at a predetermined location in a three-phase AC circuit composed of the segment coils 20 having the structure previously described. The lead wires are arranged at a location (omitted from the drawings) at which terminals of electric power lines are arranged so as to supply electric power to the three-phase AC circuit composed of the segment coils 20 in the stator 1. The operation flow progresses to step S70.

In step S70 of FIG. 8, the coil end parts 21 of the segment coils 20 are inclined toward the circumferential direction of the stator core 10 so that the segment coil 20a projecting from one slot 11 and the segment coil 20b projecting from the other slot 11, which are adjacently arranged in the circumferential direction of the stator core 10, are arranged close to or in contact with each other. This makes it possible to reduce the overall size of the stator 1 in the axial direction of the stator 1. The operation flow progresses to step S80.

In step S80, the exposed conductor part 23 of the coil end parts 21 of the segment coils 20, which are radially close to each other, are electrically connected together by welding. The operation flow progresses to step S90.

In step S90, the insulators 30 arranged in the stator core 10 of the stator 1 are heated by using a direct resistance heating (DH) device or an induction heating (IH) device. When receiving electric power, the DH device or the IH device generates thermal energy to perform the heating of the insulators 30. Because the stator 1 according to the exemplary embodiment uses a foam insulator material, the foam insulator material foams when receiving thermal energy generated by the DH device or the IH device. The gaps between the segment coils arranged in the slots 11 of the stator core 10 are filled with the foamed insulator material. This fixes the segment coils 20 into the slots 11 of the stator core 10. The operation flow progresses to step S100.

In step S100, the exposed conductor parts 23 of the coil end parts 21 of the segment coils 20 are sealed by the sealing insulator 40 (hereinafter, this step will be referred to as the sealing insulator formation step).

In the sealing insulator formation step, the exposed conductor parts 23 and the covered conductor parts 24 close to each other are arranged in a recess part formed in a die (omitted from the drawings). A thermosetting resin is supplied into the recess part of the die so as to form the sealing insulator 40 by the DH device or IH device. This hardens the thermosetting resin to form the sealing insulator 40. After this, the stator 1 is removed from the recess part of the die so as to produce the stator 1 shown in FIG. 3 and FIG. 4, in which the exposed conductor parts 23 and the covered conductor parts 24 close to each other are sealed with the sealing insulator 40.

Figure 13:
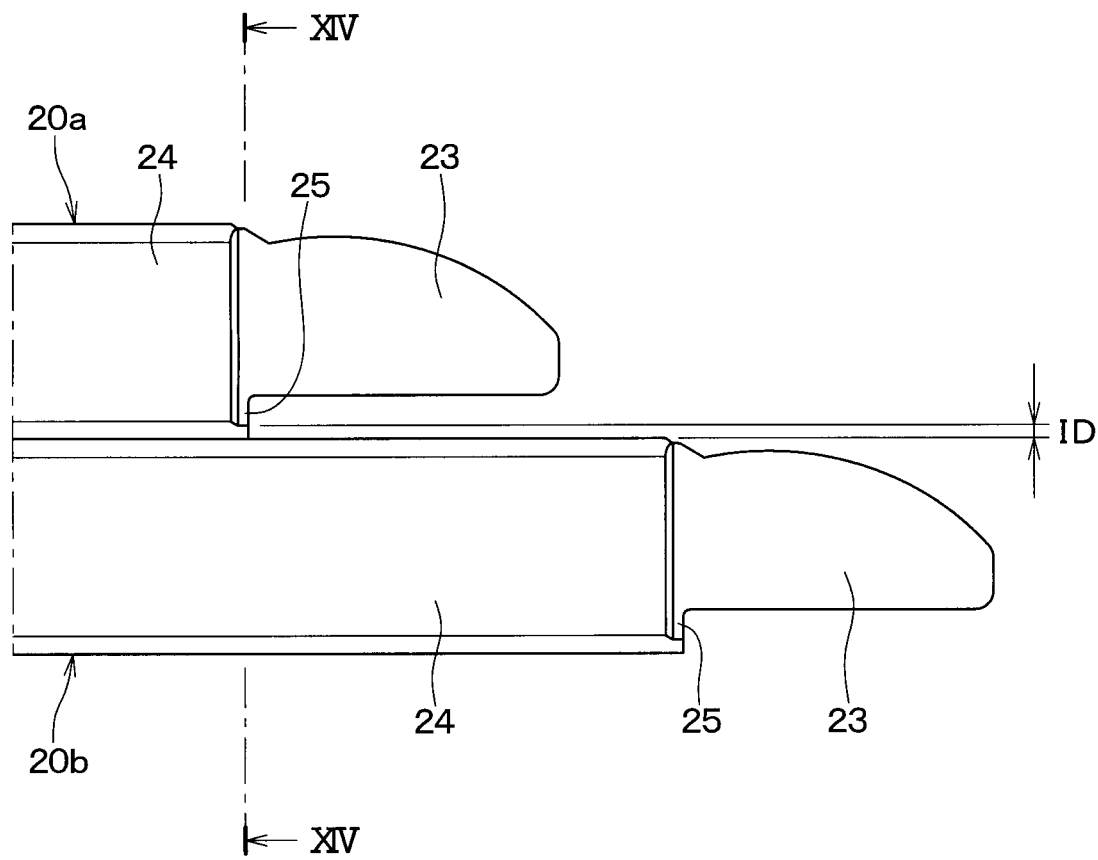
FIG. 13 is a side view of a part of the segment coils projecting from the slots adjacently arranged in the circumferential direction of the stator core shown in FIG. 12.
Figure 14:
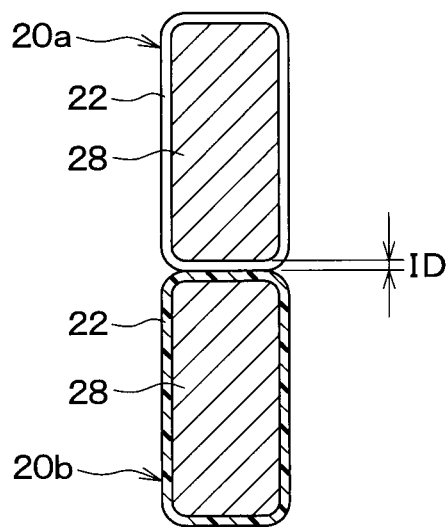
FIG. 14 is a view showing a cross section of the two segment coils along the line XIV-XIV shown in FIG. 13.

A description will now be given of a comparative example of a stator so as to compare in structure, behavior and effects with the stator 1 according to the exemplary embodiment of the present disclosure with reference to FIG. 12 to FIG. 14.

Figure 12:
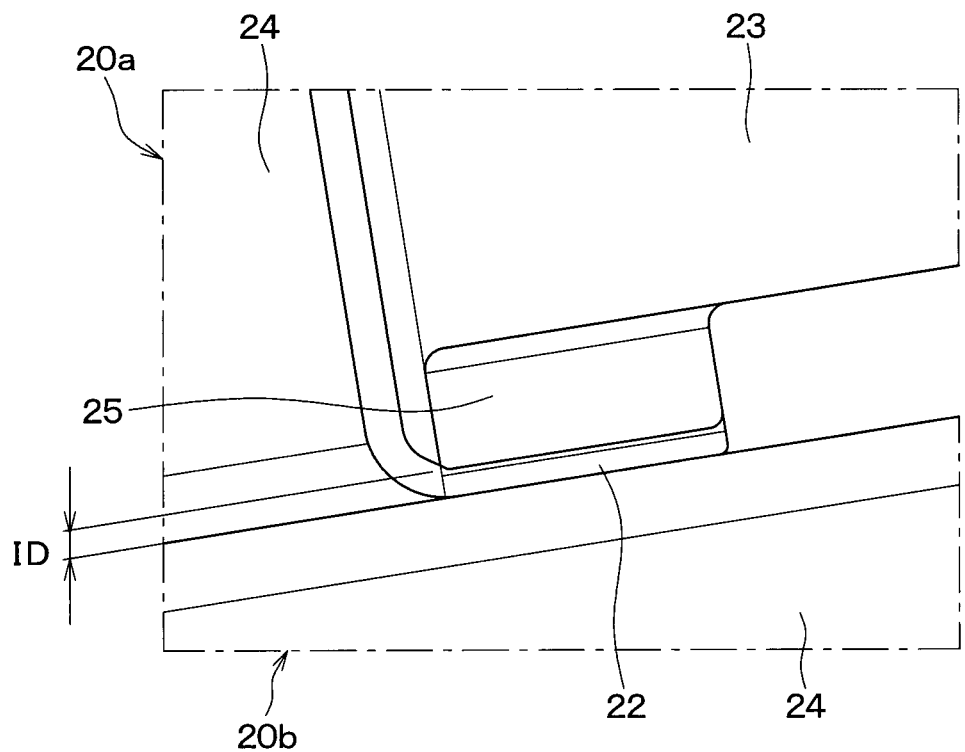
FIG. 12 is an enlarged perspective view showing a segment coil projecting from one slot and another segment coil projecting from the other slot arranged adjacently in a circumferential direction of a stator core of a stator according to a comparative example.

FIG. 12 is an enlarged perspective view showing a segment coil 20a projecting from one slot 11 and another segment coil 20b projecting from the other slot 11 arranged adjacently in a circumferential direction of a stator core of a stator according to a comparative example. FIG. 13 is a side view of a part of the segment coils 20a, 20b projecting from the slots 11 adjacently arranged in the circumferential direction of the stator core shown in FIG. 12. FIG. 14 is a view showing a cross section of the two segment coils 20a, 20b along the line XIV-XIV shown in FIG. 13.

The stator according to the comparative example is produced without performing the crushing step, which has been explained in step S33. That is, a part of the EW surfaces of the segment coil 20 is not crushed in the stator according to the comparative example. Accordingly, the step part 25 in the segment coil 20 is not covered with the electrical insulation film 22 in the stator according to the comparative example. When one segment coil 20a and the other segment coil 20b are arranged in contact with each other, the insulation gap having the predetermined insulation distance ID between the exposed conductor part 23 of one segment coil 20a and the covered conductor part 24 of the other segment coil 20b becomes equal to the thickness of the electrical insulation film 22 of the segment coil 20. In the stator according to the comparative example having the structure previously described, when electric power is supplied to the segment coils 20 forming the three-phase AC circuit, an electric discharge often occurs between the exposed conductor part 23 of one segment coil 20a and the covered conductor part 24 of the other segment coil 20b. This provides a damage to the electrical insulation film 22 of the segment coils 20. In order to avoid this drawback, it is difficult to adjacently arrange or arrange the segment coils close to each other, projecting from the adjacent slots in the circumferential direction of the stator core in the structure of the stator according to the comparative example. This prevents the overall size of the stator from being reduced and miniaturized.

As previously described, the stator 1 having the improved structure according to the exemplary embodiment of the present disclosure has the following behavior and effects.

(1) The stator 1 according to the exemplary embodiment has the improved structure in which the step part 25 formed on the covered conductor part 24 of one segment coil 20a at the stator core 10 side is adjacent to the exposed conductor part 23 of the other segment coil 20b. The step part 25 formed on the covered conductor part 24 of one segment coil 20a at the stator core 10 side is covered with the electrical insulation film 22 which is also continuously formed on the covered conductor part 24 from the stator core 10 side. This structure makes it possible to form the insulation gap having the predetermined insulation distance ID between the exposed conductor part 23 of one segment coil 20a and the covered conductor part 24 of the other segment coil 20b even if these segment coils 20a, 20b, projecting from the adjacent slots 11 in the circumferential direction of the stator core 10, are arranged close to or in contact with each other. This structure accordingly makes it possible to suppress electric discharge from occurring between the exposed conductor part 23 of the segment coil 20a and the conductor 28 covered with the electrical insulation film 22 of the segment coil 20b through the electrical insulation film 22. This structure allows the segment coils, projecting from the adjacent slots 11 in the circumferential direction of the stator core 10, to be arranged closely or in contact with to each other without occurrence of electric discharge. As a result, this structure makes it possible to reduce or miniaturize the overall size of the stator 1.

(2) The stator 1 according to the exemplary embodiment has the improved structure in which the electrical insulation film 22 covering the recess part 27, i.e. covering the step part 25 has a thickness T3 which is thinner than the thickness T4 of the electrical insulation film 22 covering the conductor 28 at the stator core 10 side except for the step part 25.

This makes it possible to easily and reliably perform the pre-cutting of the electrical insulation film 22 covering the EW surface at the position toward the end part except for the step part 25, and remove the electrical insulation film 22 from the conductor 28. This further makes it possible to prevent the electrical insulation film 22 from being removed except for the step part 25 due to a rolling-up of the electrical insulation film 22 on the step part 25.

(3) The stator 1 according to the exemplary embodiment has the improved structure in which the surface 231, at the distal end side except for the step part 25, at the stator core 10 side of the exposed conductor part 23 is arranged parallel with the axis Ax of each segment coils 20. This arrangement makes it possible to satisfy that the gap S between the exposed conductor part 23 of one segment coil 20a and the covered conductor part 24 of the other segment coil 20b is approximately equal to or greater than the insulation gap having the predetermined insulation distance ID on the overall surface 231 at the stator core 10 side of the exposed conductor part 23 of the segment coil 20a. This improved structure of the stator 1 according to the exemplary embodiment makes it possible to reliably suppress electric discharge from occurring between the exposed conductor part 23 of one segment coil 20a and the electrical insulation film 22 covering the covered conductor part 24 of the other segment coil 20b.

(4) The method of producing the stator 1 according to the exemplary embodiment includes the following specific steps.

In step S33, the recess part 27 is formed by pushing a predetermined position onto the electrical insulation film 22 covering the segment coil 20. In step S34, a notch is formed on the electrical insulation film 22 at the intermediate position of the recess part 27 formed in the segment coil 20. In step S35, the cutting process is performed to reduce the thickness T2 of the exposed conductor part 23, at the distal end side from the intermediate position of the recess part 27. This allows the electrical insulation film 22 to continuously cover the step part 25 at the proximal end side from the intermediate position of the recess part 27. The method according to the exemplary embodiment makes it possible to produce the stator 1 having a reduced size with greater insulation reliability.

(5) In step S33 of the method of producing the stator 1 according to the exemplary embodiment, the pressure punch 54 forcedly presses the predetermined position on the conductor 28 and the electrical insulation film 22 of the segment coil 20 by a pressure more than the yield point of the conductor 28 and the electrical insulation film 22 so as to crush the conductor 28 and the electrical insulation film 22 of the segment coil 20 together. The step S33 causes plastic deformation of the conductor 28 and the electrical insulation film 22 of the segment coil 20. As a result, the thickness T3 of the electrical insulation film 22 covering the recess part 27 becomes thinner than the thickness T4 of the electrical insulation film 22 covering the covered conductor part 24 at the proximal end side from the location of the recess part 27. Accordingly, the pre-cutting of the electrical insulation film 22 in step S34 is easily and reliably performed so as to cut the electrical insulation film 22 at the intermediate position of the recess part 27. This makes it possible to prevent the electrical insulation film 22 from being removed from the step part 25 due to a rolling-up of the electrical insulation film 22 on the step part 25.

Other Modifications

The concept of the present disclosure is not limited by the exemplary embodiment previously described. While the preferred embodiment of the present disclosure has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

For example, it is possible for the exemplary embodiment of the present disclosure to have the following modifications.

(a) In the stator according to the exemplary embodiment previously described, the FW surface of the segment coil is arranged radially facing the stator core 10 and the EW surface of each segment coil 20 is arranged facing the circumferential direction of the stator core 10. However, the concept of the present disclosure is not limited by this structure. It is acceptable for the stator 1 to have a structure in which the EW surface of the segment coil is arranged radially facing the stator core 10 and the FW surface of each segment coil 20 is arranged facing the circumferential direction of the stator core 10. In the latter situation, the step part 25 is formed on the FW surface of the segment coil 20.

(b) In the stator according to the exemplary embodiment previously described, the step part 25 covered with the electrical insulation film 22 is formed on the surface at the stator core 10 side of the segment coil 20. However, the concept of the present disclosure is not limited by this structure. It is acceptable for the stator 1 to have a structure in which the step part 25 covered with the electrical insulation film 22 is formed on one or more surfaces of the segment coil 20.

(c) In the stator according to the exemplary embodiment previously described, the segment coil 20 is made of a flat wire. However, the concept of the present disclosure is not limited by this structure. It is acceptable for the stator 1 to have a structure in which the segment coils 20 are made of members, a cross section of which is one of, or a combination of a circular shape, an elliptical shape and a polygonal shape.

(d) In the stator according to the exemplary embodiment previously described, the insulator 30 is made of foam insulator. However, the concept of the present disclosure is not limited by this structure. It is acceptable for the stator 1 to have a structure in which the insulator 30 is made of an insulation material. In this case, the segment coils 20 and the insulator 30 are fixed together into the slots 11 formed in the stator core 10 by using varnish, etc., instead of using foam insulator.

What is claimed is:

1. A stator for a rotary electric machine, comprising:
a stator core comprising teeth and slots between the teeth and having an axis; and
segment coils in the slots,
wherein
each of the segment coils (i) projects from one of the slots and (ii) comprises a covered conductor part having a conductor covered with an electrical insulation film and an exposed conductor part having the conductor not covered by the electrical insulation film,
the exposed conductor part is at a distal end from the covered conductor part of the each of the segment coils,
the segment coils are connected through the exposed conductor parts projecting from the slots, the exposed conductor part has a first thickness which is thinner than a second thickness of the covered conductor part when viewed in a radial direction of the stator core, the covered conductor part includes a step part adjacent to the exposed conductor part, the step part and the covered conductor part are covered with the electrical insulation film continuously from the stator core side of the covered conductor part, a distance, when viewed in the radial direction, from the exposed conductor part of a first of the segment coils and the covered conductor part of a second of the segment coils that is adjacent to the first of the segment coils is greater than a thickness of the electrical insulation film of the second of the segment coils, and the electrical insulation film covering the step part has a third thickness which is thinner than a fourth thickness of the electrical insulation film of the covered conductor part except for the step part.

2. The stator according to claim 1, wherein
a surface of the exposed conductor part is parallel with an axis of the segment coils except for the step part.

3. The stator according to claim 1, wherein
a surface of the exposed conductor part is parallel with an axis of the segment coils except for the step part.

4. A method of producing a segment coil for a stator of a rotary electric machine, the segment coil having a covered conductor part with a conductor covered with an electrical insulating film and an exposed conductor part with the conductor not covered with the electrical insulating film, comprising steps of:

pressing a predetermined position on the segment coil so as to form a recess part on the segment coil at which the conductor of the segment coil and the electrical insulating film are compressed and plastically deformed and a thickness of the electrical insulating film between the conductor and an outer face of the electrical insulating film is reduced;

forming a notch at an intermediate position of the recess part, and removing the electrical insulating film at the notch and toward a distal end of the segment coil to form (i) the exposed conductor part and (ii) a step part in the covered conductor part at a proximal end side from the intermediate position of the recess part.

5. The method according to claim 4, wherein, in the step of pressing the predetermined position, the predetermined position is pressed by a pressure which is greater than a yield point of the conductor and the electrical insulating film covering the segment coil.

6. A stator for a rotary electric machine, comprising:
a stator core comprising teeth and slots between the teeth and having an axis; and
segment coils in the slots,
wherein each of the segment coils (i) projects from one of the slots and (ii) comprises a covered conductor part having a conductor covered with an electrical insulation film and an exposed conductor part having the conductor not covered by the electrical insulation film,
the exposed conductor part is at a distal end from the covered conductor part of the each of the segment coils,
the segment coils are connected through the exposed conductor parts projecting from the slots,
the exposed conductor part has a first thickness which is thinner than a second thickness of the covered conductor part when viewed in a radial direction of the stator core, the covered conductor part includes a step part adjacent to the exposed conductor part, the step part and the covered conductor part are covered with the electrical insulation film continuously from the stator core side of the covered conductor part, and the electrical insulation film covering the step part has a third thickness between the conductor and an outer face of the electrical insulation film that is thinner than a fourth thickness of the electrical insulation film of the covered conductor part between the conductor and the outer face of the electrical insulation film except for the step part.

7. The stator according to claim 6, wherein
a surface of the exposed conductor part is parallel with an axis of the segment coils except for the step part.

8. The stator according to claim 6, wherein:
an insulation gap of a predetermined insulation distance in a circumferential direction is between the exposed conductor part of a first segment coil of the segment coils and the covered conductor part of a second segment coil of the segment coils, the second segment coil being adjacent to the first segment coil; and
the predetermined insulation distance is greater than the thickness of the electrical insulating film of the first and second segment coils.

9. A method of producing a stator for a rotary electric machine, the stator having a stator core and a plurality of segment coils, each of the plurality of segment coils having a covered conductor part with a conductor covered with an electrical insulating film and an exposed conductor part with the conductor not covered with the electrical insulating film, comprising steps of:

pressing a predetermined position on the each of the plurality of segment coils so as to form a recess part on the each of the segment coils at which the conductor and the electrical insulating film of the each of the segment coils are compressed and plastically deformed and a thickness of the electrical insulating film between the conductor and an outer face of the electrical insulating film is reduced;

forming a notch at an intermediate position of the recess part;

removing the electrical insulating film at the notch and toward a distal end of the each of the plurality of segment coils to form (i) the exposed conductor part and (ii) a step part in the covered conductor part at a proximal end side from the intermediate position of the recess part;

inserting the each of the plurality of segment coils into a separate slot of the stator core of the stator;

inclining the each of the plurality of segment coils such that the step part faces the stator core; and electrically connecting the exposed conductor parts of the each of the plurality of segment coils;

wherein, in the pressing the predetermined position step, a pressure on the each of the plurality of segment coils at the predetermined position is greater than a yield point of the conductor and the electrical insulating film such that the pressing causes plastic deformation of the conductor and the electrical insulating film and the electrical insulating film covering the step part has a first thickness between the conductor and the outer face of the electrical insulating film which is thinner than a second thickness of the electrical insulating film covering the covered conductor part between the conductor and the outer face of the electrical insulating film except for the step part.

* * * * *